No. 671,432. Patented Apr. 9, 1901.
J. B. & A. BENSON.
DIFFERENTIAL GEAR.
(Application filed Oct. 20, 1899.)
(No Model.)

Witnesses:
Edna B. Johnson
S. S. Noble

Inventors,
Jno B. Benson
Andrew Benson
By Elliott + Hopkins
Attorneys.

THE NORRIS PETERS CO., PHOTO-LITHO., WASHINGTON, D. C.

UNITED STATES PATENT OFFICE.

JOHN B. BENSON AND ANDREW BENSON, OF CHICAGO, ILLINOIS, ASSIGNORS OF ONE-HALF TO ROBERT P. PRICE AND JOHN P. PRICE, OF SAME PLACE.

DIFFERENTIAL GEAR.

SPECIFICATION forming part of Letters Patent No. 671,432, dated April 9, 1901.

Application filed October 20, 1899. Serial No. 734,174. (No model.)

*To all whom it may concern:*

Be it known that we, JOHN B. BENSON and ANDREW BENSON, citizens of the United States, residing at No. 53 River street, in the city of Chicago, county of Cook, and State of Illinois, have invented certain new and useful Improvements in Differential Gears, of which the following is a full, clear, and exact specification.

Our invention relates more particularly to differential gears for automobiles or motor-carriages; but it will nevertheless be understood that it is applicable to other and various forms of machinery where it is desired to derive a variable speed from a member moving with approximately uniform speed.

Our invention has for its primary object to cause any one of a series of graduated driving-gears to drive any one of a series of graduated driven gears.

Another object of our invention is to provide a simple form of variable gear especially applicable where the motor or power shaft revolves continuously in the same direction and whereby the motion of the driven shaft or other member may be reversed at pleasure.

Another object is to make it impossible to start up in either direction excepting at the lowest speed or to reverse without first reducing the speed to the lowest speed attainable with the gear.

A further object of our invention is to provide a simple and efficient reversing device whereby the motion of a driving-shaft may be communicated to the driven shaft or member.

With these ends in view our invention consists in certain features of novelty in the construction, combination, and arrangement of parts by which the said objects and certain other objects hereinafter appearing are attained, all as fully described with reference to the accompanying drawings, and more particularly pointed out in the claims.

Figure 1:
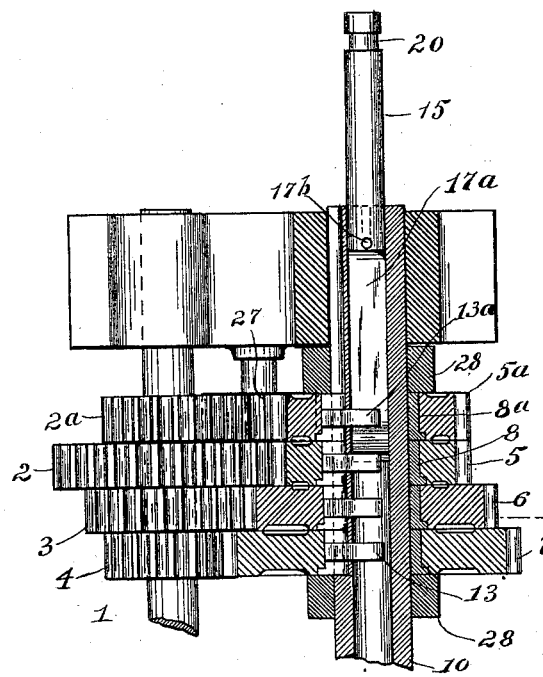
Figure 2:
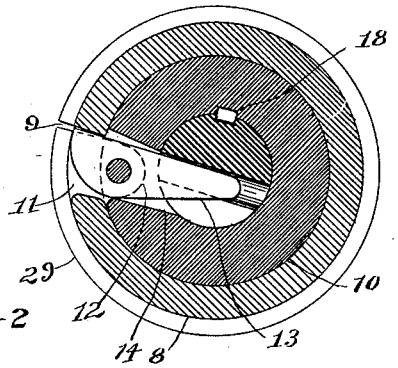
Figure 3:
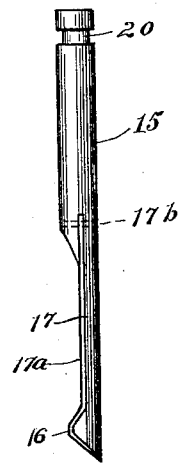
Figure 4:
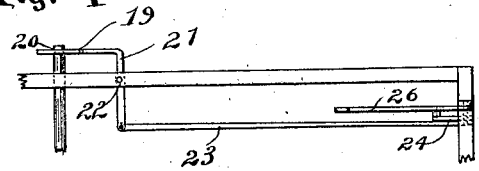
Figure 5:
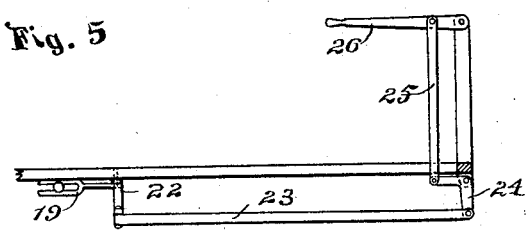

In the said drawings, Figure 1 is an elevation of our improved variable gear, showing one set of gears and the driving-shaft in longitudinal section. Fig. 2 is a transverse sectional view taken on the line 2 2, Fig. 1, on an enlarged scale, showing only the expansible ring and mechanism contained therein, hereinafter described. Fig. 3 is a detail view of the wedging rod, hereinafter described. Fig. 4 is a plan view of the mechanism whereby said rod is shifted, and Fig. 5 is a side elevation thereof.

1 represents the driven shaft or member, which when the device is used on a vehicle would be either the axle or a shaft connected with the axle, and on this shaft 1 is arranged a plurality of graduated gears 2 3 4, which are rigidly secured thereto. Meshing with the gears 2 3 4, respectively, are a corresponding number of graduated gears 5 6 7, arranged in the reverse order of the first said gears. The gears 5 6 7, however, are each sleeved loosely upon a ring 8, which is split or divided at 9 and is mounted upon a hollow shaft 10, to which the power is applied or which may be termed the "driving-shaft." Each of the rings 8 is recessed at 11 and provided with a lug 12, to which is pivoted a lever 13. The outer end of this lever, as better shown in Fig. 2, is curved on one side, so as to be free to oscillate in its recess, while the other side is straight and abuts against one end of the split ring 8. The tailpiece or inner end of the lever 13 projects through a passage 14, cut in the side of the hollow shaft 10, and extends into the interior of the shaft 10. It will now be seen that when either one of the levers 13 is oscillated upon its pivot in the proper direction to bring its flat edge against the end of the ring 8 the tendency will be to expand the ring, and by thus expanding within its gear 5, 6, or 7 rotative force will be imparted to the latter, and consequently communicated to the one of the gears 2 3 4 with which it is in mesh. This oscillation of any one of the levers 13 may be effected at pleasure by means of a sliding wedge-bar 15, which is fitted within the hollow driving-shaft 10 and is provided on one end with a wedge 16, having a double bevel, so that the wedge may squeeze past any one of the levers 13 in either direction, the bar 15 being cut away, as shown at 17, a sufficient distance to clear the entire series of levers 13, and the bar 15 and shaft 10 being held against relative rotation by a spline 18. In order that the wedge-bar may always produce sufficient pressure against the levers 13 and at the same time readily pass them, the wedge 16 is formed on a bladespring 17ª, having one end let into a slot in the bar 15 and held by a pin 17ᵇ and the other end bent down over the beveled end of the wedge-bar. It will thus be seen that when the bar 15 is forced inwardly a sufficient distance to bring its wedge 16 into engagement with any one of the levers 13 the gear controlled by that lever will be rendered active and the motion of that gear imparted to its companion gear on the driven shaft 1. This motion of the wedge-bar 15 may be effected in any suitable way. The example shown in the drawings consists of a fork or yoke 19, which embraces a groove 20 in the outer end of the bar 15 and has a bell-crank 21, pivoted at 22 and connected by rod 23 to a bell-crank 24, which latter is connected by link 25 with a hand operating-lever 26.

In order that the motion of the driven shaft 1 may be reversed, we provide the driven shaft with an extra gear 2ª and the driving-shaft with an extra loose gear 5ª, which is controlled, like the gears 5 6 7, by a split ring 8ª and lever 13ª, all constructed and arranged the same as each of the parts already described with reference to the gears 5 6 7, and the lever 13ª being adapted to be oscillated by the wedge 16, as before described with reference to the other levers 13. When the wedge-bar 15 is in its normal position, the wedge 16 is supposed to rest between the lever 13 of the smallest gear or lowest-speed gear and the lever 13ª of the reversing-gear 5ª, which latter is of course connected or geared to the gear 2ª by an interposed idler 27. Hence it will be seen that the first movement of the wedge-bar 15 in either direction will either back the vehicle or start it at the lowest speed, and it will also be seen that in order to attain the highest speed it is necessary to pass from the lowest to the highest, and vice versa, and when going at the highest speed it is impossible to reverse without first bringing the wedge of the wedge-bar into engagement with the lever 13, which produces the lowest speed.

The loose gears 5ª, 5, 6, and 7 and their split rings 8 8ª are held against longitudinal movement on the shaft 10 by any suitable means, as by collars 28, and each of the rings, if desired, may be formed with a flange or shoulder 29, which fits into a corresponding recess in each of the gears 5ª, 5, 6, and 7, thus holding the rings in place relatively to their respective gears.

Having thus described our invention, what we claim as new therein, and desire to secure by Letters Patent, is—

1. A variable-gear mechanism having in combination a driving-shaft, driven gears, loose gears meshing therewith, a series of pivoted levers, means in connection with said levers for binding either of said loose gears to said driving-shaft and a wedge-bar for oscillating either of said levers for binding said gears, substantially as set forth.

2. A variable-gear mechanism having in combination loose gears, driven gears meshing therewith, a driving-shaft, divided recessed rings surrounding said driving-shaft and contained one within each of said loose gears, a lever pivoted in the recess of each of said rings and having one end adapted to bear against one end of its said ring and the other end projecting into the ring and means contained within the ring for oscillating either of said levers, substantially as set forth.

3. A variable-gear mechanism having in combination driven gears, driving-gears meshing therewith respectively, a hollow driving-shaft, divided rings surrounding said driving-shaft and arranged within said loose gears respectively, levers for expanding said rings having their ends projecting into said hollow shaft and a sliding wedge-bar arranged in the hollow shaft and having its end provided with a wedge adapted to pass and engage with either of said levers, substantially as set forth.

4. A variable-gear mechanism having in combination a driven shaft, loose gears, driven gears connected therewith respectively, expansible collars upon which said loose gears are journaled and means comprising a wedge-bar for expanding said collars separately, said wedge-bar being provided with a spring having a wedge formed thereon, substantially as set forth.

JOHN B. BENSON.
ANDREW BENSON.

Witnesses to signature of John B. Benson:
L. K. MACNEILL,
W. H. WHITE.
Witnesses to signature of Andrew Benson:
F. A. HOPKINS,
EDNA B. JOHNSON.